United States Patent
Zaltsman et al.

(10) Patent No.: US 10,944,609 B1
(45) Date of Patent: Mar. 9, 2021

(54) AUTOMATIC OFDM PROFILE SELECTION

(71) Applicant: Harmonic, Inc., San Jose, CA (US)

(72) Inventors: Ariel Zaltsman, Raanana (IL); Liav Kastanovich, Petah Tikva (IL)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 16/798,940

(22) Filed: Feb. 24, 2020

Related U.S. Application Data

(60) Provisional application No. 62/814,716, filed on Mar. 6, 2019.

(51) Int. Cl.
*H04L 27/26* (2006.01)
*H04L 5/00* (2006.01)

(52) U.S. Cl.
CPC .......... *H04L 27/2647* (2013.01); *H04L 5/006* (2013.01); *H04L 5/0007* (2013.01); *H04L 5/0046* (2013.01)

(58) Field of Classification Search
CPC . H04L 27/2647; H04L 5/0007; H04L 5/0046; H04L 5/006
See application file for complete search history.

(56) References Cited

U.S. PATENT DOCUMENTS

| | | | |
|---|---|---|---|
| 2014/0133352 A1 | 5/2014 | Chapman et al. | |
| 2015/0188653 A1 | 7/2015 | Hanks et al. | |
| 2017/0141887 A1* | 5/2017 | Garcia | H04L 1/0005 |
| 2018/0102868 A1 | 4/2018 | Sundaresan et al. | |
| 2018/0131582 A1 | 5/2018 | Schnitzer et al. | |

* cited by examiner

*Primary Examiner* — Curtis B Odom
(74) *Attorney, Agent, or Firm* — Brokaw Patent Law PC; Christopher J. Brokaw (57) ABSTRACT

Assigning an appropriate modulation profile for an orthogonal frequency-division multiplexing (OFDM) channel. The current modulation profile assigned to a specific cable modem for communicating over a specific OFDM channel is examined to determine whether to consider reassigning the specific cable modem to a different modulation profile. Only upon determining consideration should be given, an assessment is made as to which modulation profile, of a set of candidate modulation profiles available to that cable modem for communicating over the specific OFDM channel, should be assigned to the specific cable modem using linear domain averaging over the OFDM subcarriers of the ratios between a Mean Error Rate (MER) threshold per subcarrier for the specific cable modem and the MER reported by the specific cable modem per subcarrier. A new modulation profile is assigned to the specific modem based on the assessment.

21 Claims, 5 Drawing Sheets

AUTOMATIC OFDM PROFILE SELECTION

CLAIM OF PRIORITY

The present application claims priority to U.S. Provisional Patent Application No. 62/814,716, entitled "Automatic OFDM Profile Selection," filed Mar. 6, 2019, the disclosure of which is hereby incorporated by reference for all purposes in its entirety as if fully set forth herein.

FIELD OF THE INVENTION

Embodiments of the invention generally relate to selecting an appropriate DOCSIS modulation profile for an orthogonal frequency-division multiplexing (OFDM) channel.

BACKGROUND

Data Over Cable Service Interface Specification (DOCSIS) is a widely used industry standard for transferring digital data over the existing cable television (CATV) infrastructure. DOCSIS, initially released in 1997, has been occasionally updated with a new version. The current version of DOCSIS is 3.1, which introduced the concept of a profile for an orthogonal frequency-division multiplexing (OFDM) channel.

OFDM is a multiplexing technique used to simultaneously send multiple signals, or channels, over a single transmission medium such that the signals constituting the separate channels overlap. The overlapping signals do not interfere with one another because the signals are orthogonal, i.e., when each individual signal is at its peak, the adjacent signals are at their null point. OFDM provides for greater throughput of data due to the allowance of overlapping of signals in contrast to prior multiplexing approaches such as frequency-division multiplexing.

The profile for an OFDM channel may be used by a CATV operator to describe the information that a cable modem (CM) needs to possess to communicate over that OFDM channel. A Cable Modem Termination System (CMTS) may define one or more profiles for a particular OFDM channel. Each profile for a particular OFDM channel describes a different set of parameters, such a modulation order (also commonly referred to as a 'constellation'), Forward Error Correction (FEC), preamble, and guard interval, which define how data is to be exchanged between the CM and the CMTS for that OFDM channel.

The DOCSIS 3.1 specification informs that up to 16 profiles may be defined for a particular OFDM channel. Version 3.1 of the specification further provides a way to assign a group of profiles to a CM and recommends ways how to choose the best profile to use for exchanging data with each CM over a particular OFDM channel.

By convention, each profile is assigned a letter, e.g., profile A, profile B, and so on. Profile A is a common profile that is assigned to each CM for a particular OFDM channel, while the other profiles assigned for that particular OFDM channel may differ from CM to CM.

Each OFDM channel has its own unique set of profiles. For example, profile A on OFDM channel 1 will be different than profile A on OFDM channel 2.

The parameters that describe an OFDM channel are defined in OFDM Channel Descriptor (OCD) message, and each profile for an OFDM channel are defined in a Downstream Profile Descriptor (DPD) message. The OCD and DPD messages are sent to all CMs in the CATV system on a PHY Link Channel (PLC). When a CM initializes, it will use profile A for a particular OFDM channel until instructed by the CMTS to use a different profile.

The DOCSIS 3.1 specification describes how the CMTS may obtain, from a particular CM, information about the Signal to Noise ratio (SNR) for a particular OFDM channel. The specification also provides for the CMTS to request a particular CM to assess a particular profile and report to the CMTS information about its SNR and FEC. The CM-SP-PHY DOCSIS 3.1 specification includes an algorithm which may be used by a CMTS to select a profile for use in conjunction with a particular OFDM channel by a particular CM based the information and statistics about the SNR, FEC, and related parameters obtained from that CM.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for selecting an appropriate DOCSIS profile for an orthogonal frequency-division multiplexing (OFDM) channel are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

DRAWBACKS OF PRIOR APPROACHES

The CM-SP-PHY DOCSIS 3.1 specification defines an approach that may be used by a Cable Modem Termination System (CMTS) to select a profile for use in conjunction with a particular OFDM channel by a particular cable modem (CM) based the information and statistics about the Signal to Noise Ratio (SNR), Forward Error Correction (FEC), and related parameters obtained from that CM. It is observed by the inventors that this prior art approach may result in an incorrect estimation of the Code Error Rate (CER), also known as the Frame Error Rate (FER), for a calculated Mean Error Ratio (MER) margin. As a result, prior approaches for selecting an appropriate profile for a particular CM for use with a particular OFDM channel were inaccurate and could result in inefficient communications, which when extrapolated into real-world consequences experienced by CATV customers, translates to decreased customer satisfaction and increased costs of operating the CATV platform.

To illustrate such problems with the present state of the art, an illustrative example will be discussed with reference to FIG. 1, which is an illustration of two profiles which could be used in communicating over the same OFDM channel in accordance with the prior art. Assume that the particular DOCSIS 3.1 OFDM channel in this example operates at 204.8 Msps with a fast Fourier transform (FFT) size of 4 K and has an active bandwidth of 190 Mhz. The subcarrier spacing (i.e., the spacing be channels) is 50 kHz (204.8 MHz/4096) and the total number of active subcarriers is 3800 (190 MHz/50 kHz).

The DOCSIS 3.1 specification requires that a certain minimum average Mean Error Ratio (MER) rate be supported at the receiver (abbreviated as 'RxMER'). To illustrate, Table 1 lists the required average RxMER as the MER thresholds per modulation order by the DOCSIS 3.1 specification.

TABLE 1

| Constellation (Modulation order) | CNR (dB) |
| --- | --- |
| 4096 | 41.0 |
| 2048 | 37.0 |
| 1024 | 34.0 |
| 512 | 30.5 |
| 256 | 27.0 |
| 128 | 24.0 |
| 64 | 21.0 |
| 16 | 15.0 |

Figure 1:
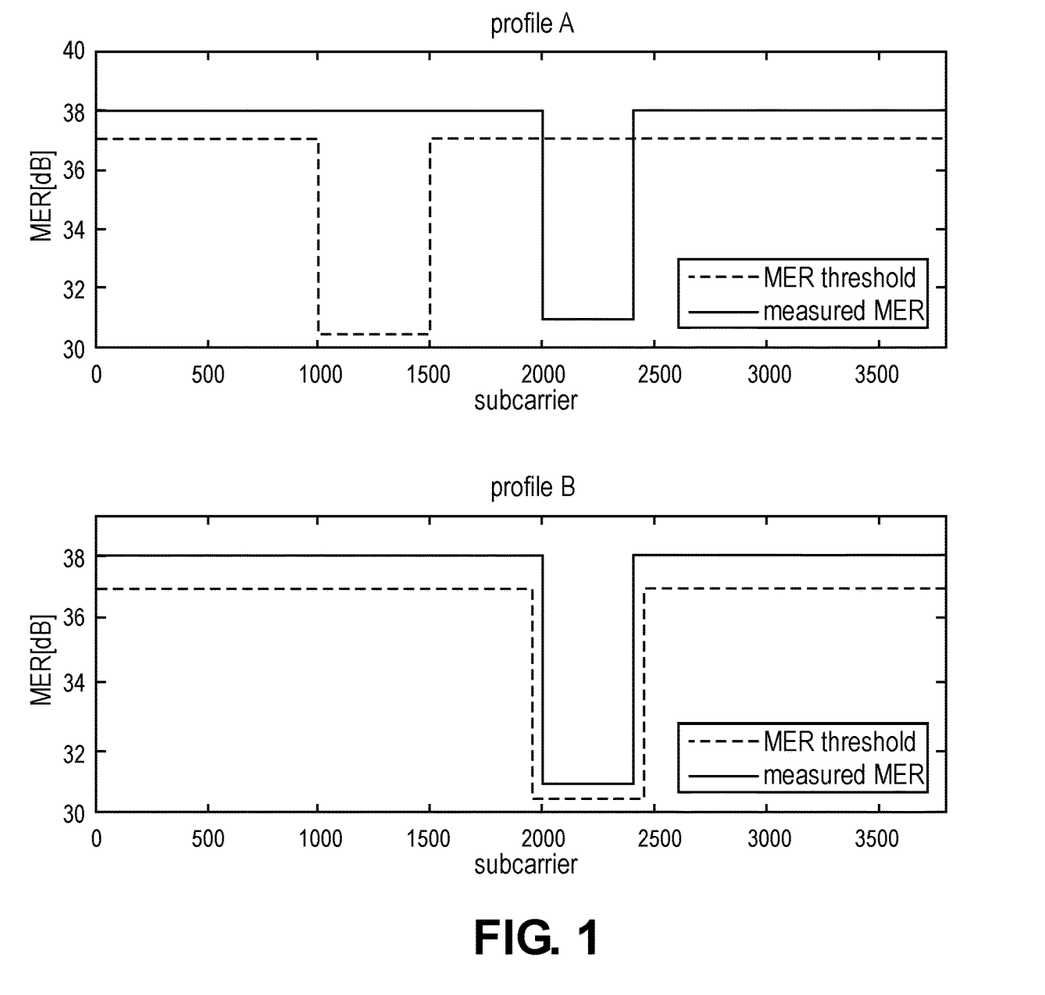
FIG. 1 is an illustration of two profiles which may be used in communicating over a orthogonal frequency-division multiplexing (OFDM) channel in accordance with the prior art.

As shown in FIG. 1, profile A has a default modulation of 2 k QAM with an exception block between subcarriers 1500 to 2000 having a modulation of 512 QAM. Table 1 describes a mapping between the modulation and the required MER. Thus, the MER threshold of profile A equals 37 dB except from subcarriers 1500 to 2000 where threshold equals 30.5 dB as depicted by the dashed line in profile A shown by FIG. 1.

Profile B shown in FIG. 1 has a default modulation is 2 k QAM with an exception block between subcarriers 1950 to 2450 having a modulation of 512 QAM. The measured MER is 38 dB but for subcarriers 2000 to 2400, where the measured MER is 31 dB as seen as solid line in both subplots of FIG. 1

The prior art approach that the CM-SP-PHY DOCSIS 3.1 specification teaches for a CMTS to select a profile for use in conjunction with a particular OFDM channel by a particular CM involves (1) calculating a value MER1, which is the average RxMER over all data subcarriers, (2) calculating a value MER2, which is the required average RxMER, and (3) calculating the Signal to Noise (SNR) margin as MER1-MER2, where all quantities are expressed in dB.

The value MER1 is the average of the measured MER; in this example, MER1 is 37.26 dB. The value MER2 of profile A is the average of the required MER for profile A and is 36.14 dB in this example. The value MER2 of profile B is the average of the required MER for profile B and is 36.14 dB in this example. As a result, the SNR_margin(profile A)=MER1-MER2=1.12 dB and SNR_margin(profile B)=1.12 dB. Thus, using the prior art approach, profile A and profile B will be assessed as having the same calculated MER margin.

However, it is clear to those of ordinary skill in the art that profile B is a better fit for the exemplary measured MER vector and provides positive MER margins for all subcarriers. In other words, the probability of error is expected to be low communicating over this exemplary OFDM channel using profile B. It is also clear to those of ordinary skill in the art that profile A does not fit the exemplary measured MER vector and provides negative MER margins between subcarrier 2000 to 2400. In other words, the probability of error communicating over this exemplary OFDM channel using profile A is expected to be high. Further, profile A provides robust modulation in a sub-band which may be loaded with higher modulation order, meaning loosing capacity for no real benefit. This example shows how the prior art cannot distinguish between multiple modulation profiles in certain situations where one profile offers clear benefits. Consequently, advancement to the state of the art in this regard would provide a great benefit to both the operators of a CMTS and the consumers of the CATV service.

Functional Overview

Embodiments of the invention optimally perform modulation profile assignment by supporting increased data capacity by the overall system while guaranteeing low data error rates per device (i.e., cable modem) for seamless communication.

Embodiments appreciate that the OFDM receiver SNR might not be flat over the channel bandwidth. Such non-uniform SNR may be caused by non-uniform noise elements or by linear effects as filter cutoff frequency or notch. The leakage of the cellular-LTE signal is a well-known narrow-band additive noise that affects SNR only on part of the wide OFDM channel in the cable system. Moreover, such noise only affects those cable modems that are in proximity to the interference source.

Due to DOCSIS 3.1 OFDM frequency interleaving and low-density parity-check (LDPC) error correction, the performance of a cable modem receiver is mandated by the average MER margins across the active spectrum. Cable modems report information about their RxMER (MER per subcarrier) to the CMTS using an OPT-RSP message in response to receiving an OPT-REQ message sent from the CMTS.

In an embodiment of the invention, a score value is calculated per profile per cable modem. The score value is based on MER margin vector averaging. The MER margin vector entries (per subcarrier) are calculated based on the RxMER vector reported by a cable modem and the corresponding MER threshold for that subcarrier based on the assigned modulation order on that subcarrier. The baseline MER threshold per the modulation depth are listed in Table 1 as they appear in the DOCSIS 3.1 specification; however, the MER thresholds in Table 1 may be configured or updated by embodiments, as a user may configure a threshold margin parameter to be used as bias to a baseline threshold table provided by some version of the DOCSIS specification. Consequently, embodiments of the invention may be used in conjunction with any version of the DOCSIS specification, and the values depicted in Table 1 are merely exemplary of one embodiment. After calculating score values for each profile, an optimal profile for use on a particular OFDM channel by a particular cable modem is selected.

In contrast to the prior art approach described in the appendix VI of the CM-SP-PHY3.1 DOCSIS specification which uses the log dB domain, embodiments of the invention advantageously employ linear domain averaging of the ratios between the MER threshold and the reported MER.

Selecting a Modulation Profile

Figure 2:
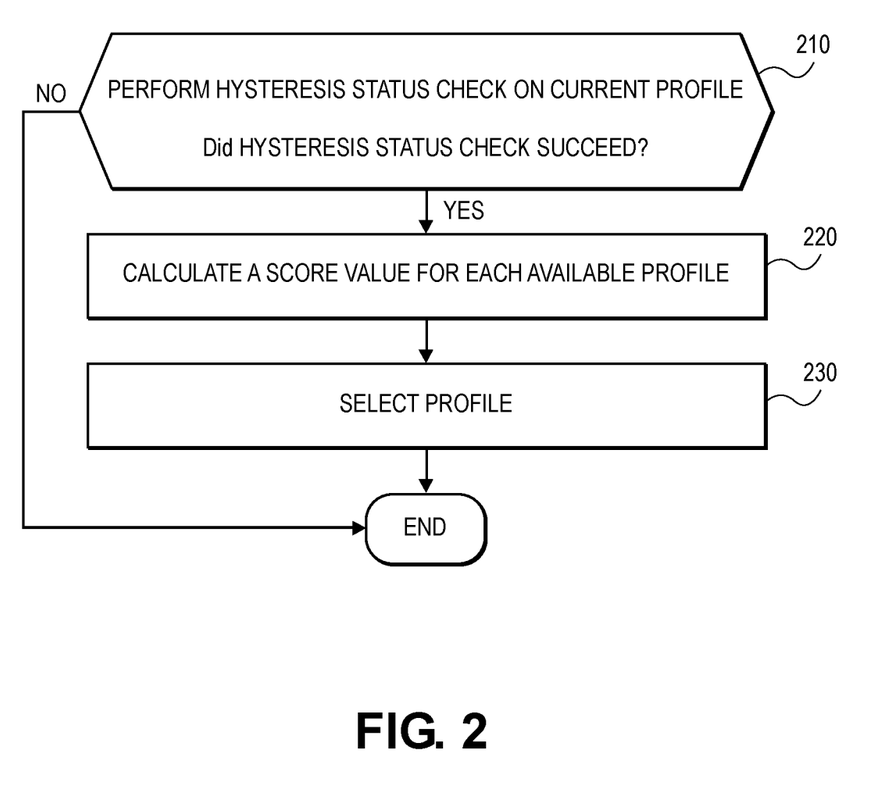
FIG. 2 is a flowchart illustrating the functional steps of selecting an appropriate DOCSIS modulation profile for an orthogonal frequency-division multiplexing (OFDM) channel in accordance with an embodiment of the invention.

FIG. 2 is a flowchart illustrating the functional steps of selecting an appropriate DOCSIS modulation profile for an orthogonal frequency-division multiplexing (OFDM) channel in accordance with an embodiment of the invention. The steps of FIG. 2 depict the process of potentially selecting a new modulation profile (hereafter a "profile") for use by a cable modem to use with respect to a single OFDM channel. The steps of FIG. 2 may be performed periodically by a CMTS at regular intervals or upon the satisfaction of a predetermined condition.

Embodiments may comprise a Cable Modem Termination System (CMTS) performing the steps of FIG. 2. In alternate embodiments, the steps of FIG. 2 may be performed by a virtualized CMTS DOCSIS core, which may, but need not, be executed upon one or more distributed servers. Embodiments may involve entities performing the steps of FIG. 2 which operate beyond the CMTS, such as but not limited to, an entity responsible for monitoring and controlling the DOCSIS network.

In step 210, a special type of status check, termed a hysteresis status check, is performed on the profile currently being used by a particular cable modem on a particular OFDM channel. In an embodiment, a hysteresis status check involves determining whether a calculated score value for the current profile used by the cable modem relative to a particular OFDM channel is greater than a predetermined hysteresis value. If true, then a new profile is selected for that cable modem to use on the particular OFDM channel; otherwise, a new profile is not selected. The calculation of a score value for a profile shall be explained in greater detail below in step 220.

To understand why step 210 is performed, it should be appreciated that profiles are not necessarily uniform across frequency, meaning that there are several modulation types across different subcarriers. As a result, a profile's MER threshold vectors are non-uniform, and thus, several profiles may yield close or even similar score values. It is undesirable to excessively switch between selected profiles. Advantageously, embodiments employ perform a hysteresis status check on the currently active profile prior to potentially selecting a new profile. A new profile is selected only if the calculated score value for this profile is greater than a hysteresis value for this profile. A profile is assumed failing, and is always de-selected, if its calculated score value is negative.

Embodiments may employ different predetermined values as a hysteresis value. To illustrate one example, a potential hysteresis value may be equal to 1 dB.

As shown in FIG. 1, if the calculated score value for the current profile used by the cable modem relative to a particular OFDM channel is not greater than the hysteresis value, then the current profile for that cable modem used to communicate of that particular OFDM channel is not changed. Otherwise, processing proceeds to step 220. Advantageously, steps 220-230 may only performed if (a) in step 210 it is determined that the calculated score value for the current profile used by the cable modem relative to a particular OFDM channel is not greater than the hysteresis value and (b) the calculated score value for the current profile is not negative; in this way, the computational intensive calculations involved in steps 220 and 230 need not be performed unless it is desirable to do so.

In step 220, a score value is calculated for each available profile that the cable modem may potentially employ to communicate over the OFDM channel. A profile's score value is the estimation of the FEC error rate of the profiles 'p', as shown below in expression 1:

$$LinearExcessdB(p) = Average\left(\frac{LINEAR[MERthreshold(p, i) + MERmargin(p)]}{LINEAR[MER(i)]}\right),$$ Expression 1 where p is the profile, i is the OFDM subcarrier index, LINEAR[x]=10^(x/10), MER(i): The MER as reported by a cable modem, MERthreshold is the appropriate value in the table of constants as defined in D3.1PHY spec Table46 (reproduced as Table 1 herein), and MERmargin(p): is a user configurable value that is used to bias the constants thresholds. The default value of MERmargin(p)=0 dB in an embodiment.

Thereafter, this calculation is converted into decibels as shown in expression 2:

$$Score(p)=Excess\ db(p)=-10*log(LinearExcessdB(p))$$ Expression 2

A score value is calculated in step 220 for each profile defined for the OFDM channel at issue. Therefore, processing proceeds to step 230.

In step 230, an optimal profile is selected for the cable modem to use with the OFDM channel. From among the available profile which may be selected for use on a particular OFDM channel (the "candidate profiles"), embodiments may employ different approaches for their selection based on whether the candidate profiles are uniform or non-uniform. A candidate profile is considered uniform if the modulation order is constant across all the subcarriers. A candidate profile is considered non-uniform if the subcarriers use two or more different modulation orders across all the subcarriers.

In an embodiment of the invention examining uniform candidate profiles, the candidate profile having lowest positive score value calculated in step 220 may be selected. When all the defined candidate profiles for a particular OFDM channel are uniform, this approach insures the selection of the profile providing the highest capacity while estimated to outperform the error rate requirements.

Figure 3:
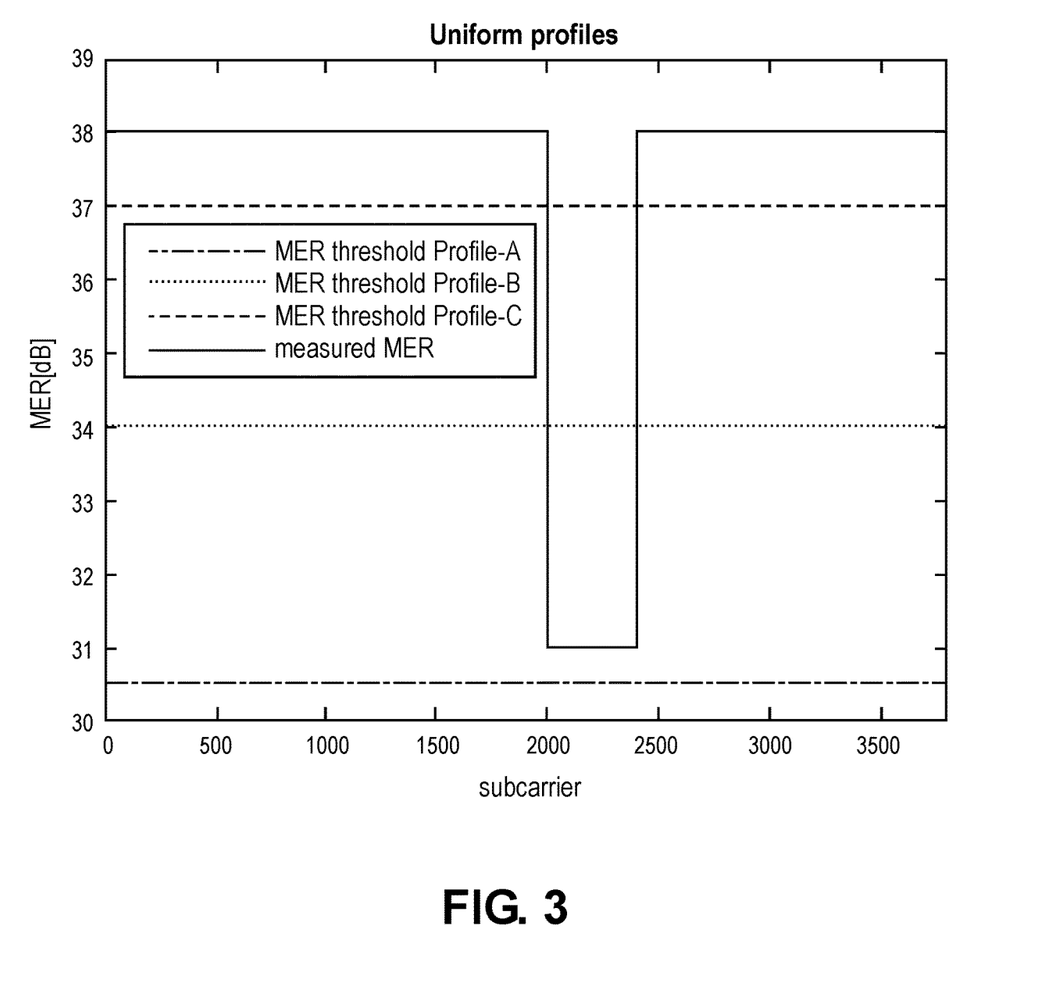
FIG. 3 is a depiction of three uniform candidate profiles which may be used by a cable modem on a particular OFDM channel in accordance with an embodiment of the invention.

To further illustrate this situation, consider FIG. 3, which is a depiction of three uniform candidate profiles which may be used by a cable modem on a particular OFDM channel in accordance with an embodiment of the invention. Profile A shown in FIG. 3 consists of a uniform 512 QAM modulation order, profile B consists of a uniform 1024 QAM constellation, and profile C consists of a uniform 2048 QAM constellation. The score values in this example are: score (A)=5.96 dB, score(B)=2.46 dB, score(C)=0.53 dB. In this example, the hysteresis value is set at 1. The score values of profile A and B are greater than the hysteresis value; therefore, profiles A and B are considered as candidates for selection. Score(B) is the smallest out of the candidate profiles; therefore, profile B is selected in this example. In the case of uniform profiles, the profile with the lowest positive score value will have the highest capacity. For example, the normalized capacity of profile B (10 bits/Hz) is greater than that of profile A (9 bits/Hz).

When assessing a non-uniform candidate profile, selecting the profile with the lowest score value (as calculated in step 220) is not optimal in terms of capacity maximization. Therefore, the non-uniform candidate profile having highest capacity value as calculated below in Expression 3.

Capacity($p$)=$\Sigma_i$ log 2(Modulation($p,i$)), where $p$ is the profile and $i$ is the OFDM subcarrier index.   Expression 3

If several non-uniform candidate profiles tie for having the having the highest capacity value, then embodiments may select the profile with the highest score value calculated in step 220 out of the capacity tie profiles. A profile's capacity value may be calculated when the profile is created or established.

Figure 4:
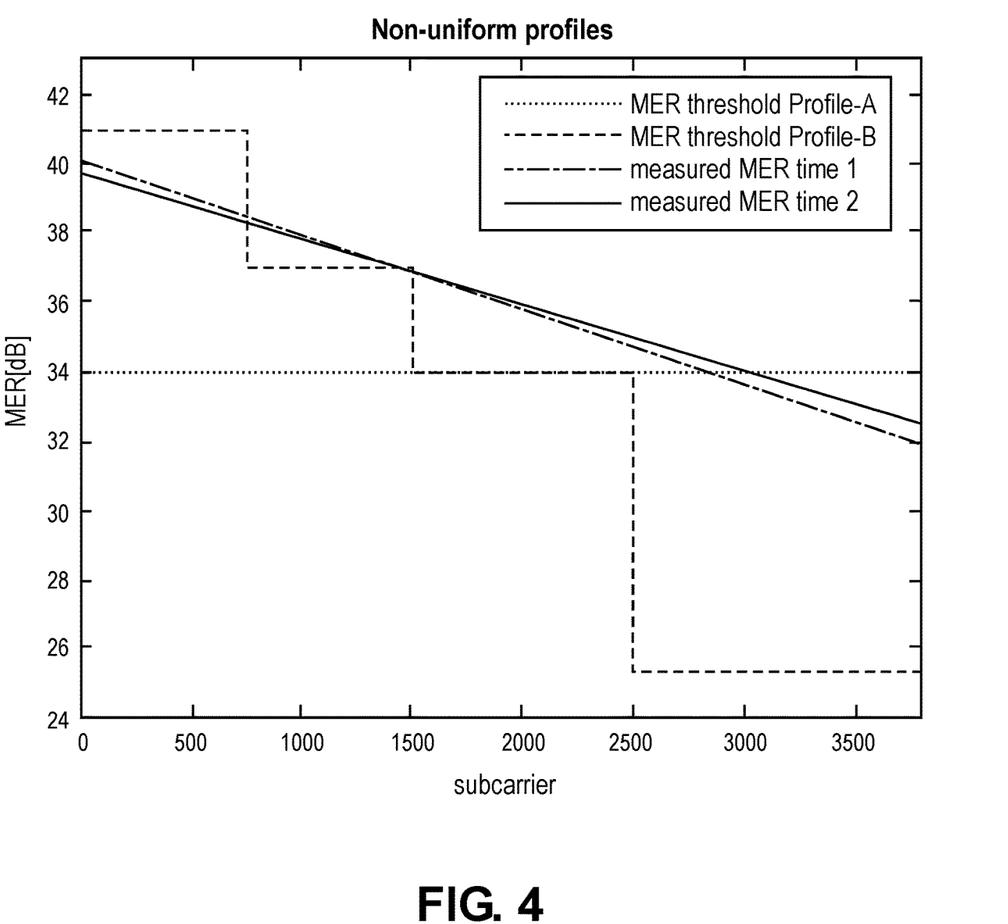
FIG. 4 is a depiction of a non-uniform profile set which may be used by a cable modem on a particular OFDM channel in accordance with an embodiment of the invention.

A non-uniform profile set consist of at least one non-uniform profile. FIG. 4 is a depiction of a non-uniform profile set which may be used by a cable modem on a particular OFDM channel in accordance with an embodiment of the invention. Profile A shown in FIG. 4 consist of a uniform bit loading of modulation 1024 QAM. Profile B shown in FIG. 4 consists of a four bit loading ranges starting at 4096 QAM and extending to 512 QAM. The MER vector was measured twice with a slight difference between the two measurements (time 1 and time 2) which is typical behavior in a system with slowly changing impairments.

The score values at time 1 in this example are: score(A) =1.40 dB, score(B)=1.63 dB. Both of their score values render these profiles candidates for selection, with profile A having a lower score value. The score values at time 2 are: score(A)=1.67 dB and score(B)=1.60 dB. Both of their score values render these profiles candidates for selection, but now profile B has a lower score value. Using only score values as the sole selection metric would result in the selection of profile A at time 1 and profile B at time 2.

Not only is it not reasonable to switch between profiles due to small measurement fluctuations, but also that profile selection (selecting profile A at time 1 and profile B at time 2) does not optimize for capacity. The total capacity of profile A is 38000 bits per OFDM symbol and the total capacity for profile B is 36345 bits per OFDM symbol. Using the highest capacity as a selection metric for all candidate profiles results in the selection of profile A at both times 1 and 2. Advantageously, such an embodiment provides profile selection stability over time and directly maximizes the system capacity.

If multiple non-uniform candidate profiles are valid for selection and have the same maximal capacity, then embodiments may perform step 230 by selecting the profile having the highest score value out of the set of maximal capacity profiles as described in step 220. Doing so ensures selection of a profile estimated to perform with the lowest error rate, as a profile's score value is a formation of the average SNR margin of that profile, and higher SNR margins provide lower error rates.

The profile that is currently being used by a cable modem relative to a particular OFDM channel may be reselected in step 230. Embodiments may perform additional or special processing when this occurs on profile A. Profile A is usually used for carrying management messages to all cable modems and typically serves as a fallback default profile. If the score value for profile A as described in step 220 is negative, then the CMTS may consider removing this channel from the channel-bonding-group(s) for that cable modem, e.g., by switching that cable modem to partial mode.

The DOCSIS version 3.1 specification, CM-SP-MULPIv3.1, at Table 10-4-CM-STATUS Event Type Codes and Status Events, defines CM-STATUS reports. CM-STATUS reports referring to OFDM profiles are Event-Code 16 (DS OFDM profile failure) and Event-Code 24 (FEC recovery on OFDM profile). These Event-Codes may be used by a CMTS in order to mark (immediately or by using some hysteresis factors) a profile as 'fit' or unfit'. The CMTS will not use an 'unfit' profile for a particular cable modem. Embodiments of employ such markings in an orthogonal to the profile selection process described with reference to FIG. 2 by removing 'unfit' profiles from consideration for a particular cable modem.

Profile Selection Process Example

To illustrate another concreate example, the profile selection process of an embodiment will be described with reference to the profiles depicted in FIG. 1. In an embodiment, the following approach may be taken:

$$SubCarrierLinearExcessdB(p, i) = \frac{LINEAR[MERthreshold(p, i) + MERmargin(p)]}{LINEAR[MER(i)]}$$

In the above approach, SubCarrierLinearExcessdB is the excess MER per subcarrier for profile p. The value of SubCarrierLinearExcessdB is limited using LowExcessdB_Threshold and HighExcessdB_Threshold in the linear scale, e.g.:

$$10^{\frac{LowExcessdB\_Threshold}{10}} \leq SubCarrierLinearExcessdB(p, i) \leq 10^{\frac{HighExcessdB\_Threshold}{10}}$$

A well performing set of limiting thresholds is LowExcessdB$_{Threshold}$=−8 dB and HighExcessdB$_{Threshold}$=+6 dB. This limited value is termed Limited_SubCarrierLinearExcessdB(p,i) LinearExcessdB(p)=Average(Limited_SubCarrierLinearExcessdB(p, i)).

As shown in FIG. 1, LinearExcessdB(profile A)=1.05; therefore score(profile A)=−0.21 dB. Also, LinearExcessdB (profile B)=0.79; therefore Score(profile B)=1.03 dB. In this example, assume that the hysteresis value is 1 dB. Only the score value of profile B (1.03 dB) is greater than the hysteresis value of 1 dB; therefore, profile B will be selected in step 230 as the optimal profile for the exemplary measured MER. Intuitively, profile B is indeed the optimal profile in this example, meaning that although profile A and profile B share the same capacity, profile B will provide better error rate performance.

Due to the exponential behavior of the bit-error-rate as a function of SNR margin on a subcarrier, the receiver performance is practically not affected by extensively low or high SNR margins. Therefore, embodiments of the invention may achieve a better error rate assessment for each profile by limiting the per-subcarrier ExcessdB. The profile selection process may consider Excess SNR limiting factors.

Zero-Bit-Loading

Table 1 lists the required modulations by DOCSIS version 3.1 by the CMTS downstream OFDM. However, there is another allowed modulation on a subcarrier, named Zero-Bit-Loading (ZBL). This modulation may be used on a profile for loading a subcarrier only with energy (random BPSK), i.e., no data modulated on the subcarrier. In the case that some cable modems experience a very strong noise over certain subcarriers within the OFDM received signal, one or more profiles can be built with ZBL modulation at these subcarriers. The automatic profile selection algorithm should select a profile containing ZBL region/s if it detects or calculates that a strong noise exist on these regions, even the lowest "real" modulation (e.g. 16 QAM) cannot sustain such a noise.

In such embodiments that employ ZBL, the steps of FIG. 2 should be adjusted such that the equation for calculating the LinearExcessdB(p) should average only the non-ZBL subcarriers of profile p. In other words, the averaging should ignore subcarrier index with Modulation(p, i)=ZBL.

Further Extensions

Embodiments may change or refine the set of profiles available for any particular OFDM channel over time to best fit cable modems reception conditions.

In embodiments of the invention, the operator of the system may manually define best fitting profiles. Alternately, in embodiments an application may automatically build a profile. In this process, the CMTS may classify groups of cable modems which suffer from similar noise pattern over the frequency domain and define a "best fitting profile" for each such group. A quote from DOCSIS PHY3.1 specification, "a profile is a list of modulations that are used for the subcarriers within an OFDM channel. The downstream can use different profiles for different groups of CMs. Generally, a group of CMs that have similar SNR performance will be grouped into the same profile".

An entity, such as but not limited to a CMTS, may assign a cable modem (CM) to the optimal profile out of the existing set of profiles. The assignment of a profile to a cable modem is dependent upon the noise pattern over the frequency. All the CMs which suffer from high interference at a certain subband should be assigned to a profile with a robust modulation at that subband.

The process of selecting a profile for a cable modem can provide vital information to the operator of a CMTS, a user manually defining the profiles, or an application responsible for building the profiles. A profile which is not selected for any CM may designated an 'Unselected Profile' and should be considered for deletion by the entity responsible for creating the profiles.

More generically, a histogram of the number of CMs assigned to employ each profile may be calculated. All profiles below a certain threshold, relative to number of CMs or an absolute threshold, may be identified as a 'Poorly-Assigned-Profile,' and may be considered for deletion by the entity responsible for creating the profiles.

In an embodiment, a profile that is always selected with a high margin, meaning score(profile)>>hysteresis value, may be identified as a 'High-Margin-Profile'. In order to optimize the system capacity, the entity responsible for profile creation may need to alter or adjust this profile. For example, this profile may be adjusted to evenly increase the modulations of the profile across the entire channel. Doing so will result in a lower score for that profile and a higher capacity for all CM's assigned to that profile. As another example of a customization which may be undertaken, the modulation of such a profile may be partially increased, e.g., by increasing only the modulation order of subcarriers assigned with the lowest modulation order in that profile vector. This will result with a slightly lower score for that profile and a somewhat higher capacity for all CM's assigned to that profile. This process may be repeated until the profile is no longer deemed a 'High-Margin-Profile.'

Profiles such as profiles A or B shown in FIG. 1 are fit to handle strong narrowband interference noise. If such a profile is assigned to a high percentage of cable modems, the operator may be alerted about this indicating that interference leakage hits large parts of the RF network.

Implementing Mechanisms

While DOCSIS 3.1 permits up to 16 profiles to be defined on the CMTS for a particular OFDM channel, it is not recommended to define too many profiles, as the CMTS data latency on the downstream is increased as a function of the number of profiles.

Figure 5:
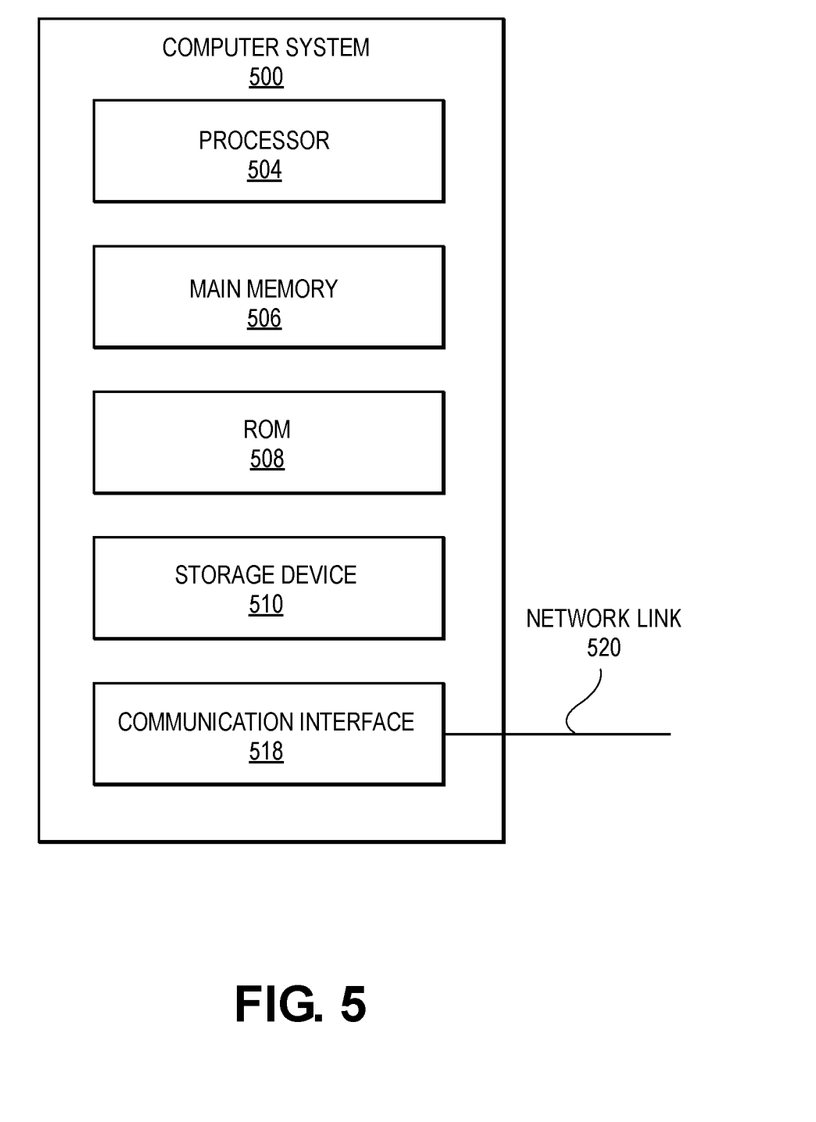
FIG. 5 is a block diagram that illustrates a computer system upon which software performing one or more of the steps or functions discussed above may be implemented.

FIG. 5 is a block diagram that illustrates a computer system 500 upon which software performing one or more of the steps or functions discussed above with reference to FIG. 2 may be implemented. In an embodiment, computer system 500 includes processor 504, main memory 506, ROM 508, storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device for storing static information and instructions for processor 504. A storage device 510, such as a magnetic disk or optical disk, is provided for storing information and instructions.

Embodiments of the invention are related to the use of computer system 500 for implementing the techniques described herein, e.g., US scheduler 510 may be embodied on a general-purpose or special-purpose computer system. According to one embodiment of the invention, US scheduler 510 may perform any of the actions described herein by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any non-transitory tangible medium that participates in storing instructions which may be provided to processor 504 for execution. Note that transitory signals are not included within the scope of a non-transitory machine-readable storage medium. A non-transitory machine-readable storage medium may take many forms, including but not limited to, non-volatile media and volatile media. Non-volatile media includes, for example, optical or magnetic disks, such as storage device 510. Volatile media includes dynamic memory, such as main memory 506.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 504 for execution. For example, the instructions may initially be carried on a magnetic disk of a remote computer. The remote computer can load the instructions into its dynamic memory and send the instructions over a network link 520 to computer system 500.

Communication interface 518 provides a two-way data communication coupling to a network link 520 that is connected to a local network. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through a local network to a host computer or to data equipment operated by an Internet Service Provider (ISP).

Computer system 500 can send messages and receive data, including program code, through the network(s), network link 520 and communication interface 518. For example, a server might transmit a requested code for an application program through the Internet, a local ISP, a local network, subsequently to communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences for assigning an appropriate modulation profile for an orthogonal frequency-division multiplexing (OFDM) channel, which when executed by one or more processors, cause:
    examining a current modulation profile assigned to a specific cable modem for communicating over a specific OFDM channel to determine whether to consider reassigning the specific cable modem to a different modulation profile for use in communicating over the specific OFDM channel;
    only upon determining said consideration should be given as a result of examining the current modulation profile, assessing which modulation profile, of a set of candidate modulation profiles available to that cable modem for communicating over the specific OFDM channel, should be assigned to the specific cable modem using linear domain averaging over the OFDM subcarriers of the ratios between a Mean Error Rate (MER) threshold per subcarrier for the specific cable modem and the MER reported by the specific cable modem per subcarrier; and
    assigning a new modulation profile to the specific modem based on said assessment.

2. The non-transitory computer-readable storage medium of claim 1, wherein the Mean Error Rate (MER) threshold per subcarrier for the specific cable modem is based, at least in part, upon a modulation order for each subcarrier and a predetermined mapping between modulation order and MER threshold.

3. The non-transitory computer-readable storage medium of claim 1, wherein examining the current modulation profile comprises:
    calculating a score value for the current modulation profile using linear domain averaging of the ratios between a Mean Error Rate (MER) threshold for the specific cable modem and the MER reported by the specific cable modem; and
    determining if the score value for the current modulation profile reflects that either the SNR conditions for the specific cable modem have improved or degraded by a predefined amount.

4. The non-transitory computer-readable storage medium of claim 3, wherein determining if the score value for the current modulation profile reflects that the SNR conditions for the specific cable modem have degraded comprises determining whether the score value for the current modulation profile has a negative value.

5. The non-transitory computer-readable storage medium of claim 3, wherein determining if the score value for the current modulation profile reflects that the SNR conditions for the specific cable modem have improved comprises determining whether the score value for the current modulation profile is larger than a determined predefined hysteresis value.

6. The non-transitory computer-readable storage medium of claim 1, wherein assessing which modulation profile, of a set of candidate modulation profiles available to that cable modem for communicating over the specific OFDM channel, should be assigned to the specific cable modem comprises:
    using a first approach to identify an optimal modulation profile from the set of candidate modulation profiles when said set of candidate modulation profiles are uniform profiles having a constant modulation order across all subcarriers; and
    using a second approach different than said first approach to identify an optimal modulation profile from the set of candidate modulation profiles are uniform profiles when said set of candidate modulation profiles are non-uniform profiles that use two or more modulation orders across all subcarriers.

7. The non-transitory computer-readable storage medium of claim 6, wherein said first approach comprises identifying a particular candidate modulation profile, from the set of candidate modulation profiles, having a lowest positive score value as the optimal modulation profile, wherein said score value is equal to $$-10*\log\left(\text{Average}\left(\frac{\text{LINEAR}[MERthreshold(p, i) + MERmargin(p)]}{\text{LINEAR}[MER(i)]}\right)\right),$$

wherein: p represents the profile, i represents the OFDM subcarrier index, LINEAR[x]=10^(x/10), MER(i) represents the reported MER by a cable modem, MERthreshold represents the appropriate value in a table of constants, and MERmargin(p) represents a user configurable value that is used to bias constant thresholds.

8. The non-transitory computer-readable storage medium of claim 6, wherein said second approach comprises, at least in part, identifying a particular candidate modulation profile, from the set of candidate modulation profiles, having highest capacity value as the optimal modulation profile, wherein said capacity value is equal to:

$\Sigma_i$ log 2(Modulation(p, i)), where p is the profile and i is the OFDM subcarrier index.

9. The non-transitory computer-readable storage medium of claim 8, wherein said second approach comprises:
upon determining that two or more profiles in the set of candidate modulation profiles are tied for the having highest capacity value, selecting, from said two or more profiles, the profile with highest score value as the optimal modulation profile,
wherein said score value is equal to $$-10*\log\left(\text{Average}\left(\frac{\text{LINEAR}[MERthreshold(p, i) + MERmargin(p)]}{\text{LINEAR}[MER(i)]}\right)\right),$$

wherein: p represents the profile, i represents the OFDM subcarrier index, LINEAR[x]=10^(x/10), MER(i) represents the reported MER by a cable modem, MERthreshold represents the appropriate value in a table of constants, and MERmargin(p) represents a user configurable value that is used to bias constant thresholds.

10. The non-transitory computer-readable storage medium of claim 1, wherein execution of the one or more sequences of instructions further cause:
identifying an optimal modulation profile from the set of candidate modulation profiles by examining a bounded portion of the excess MER per subcarrier for each of said set of candidate modulation profiles.

11. An apparatus for assigning an appropriate modulation profile for an orthogonal frequency-division multiplexing (OFDM) channel, comprising:
one or more processors; and
one or more non-transitory computer-readable storage mediums storing one or more sequences of instructions, which when execute, cause:
examining a current modulation profile assigned to a specific cable modem for communicating over a specific OFDM channel to determine whether to consider reassigning the specific cable modem to a different modulation profile for use in communicating over the specific OFDM channel;
only upon determining said consideration should be given as a result of examining the current modulation profile, assessing which modulation profile, of a set of candidate modulation profiles available to that cable modem for communicating over the specific OFDM channel, should be assigned to the specific cable modem using linear domain averaging over the OFDM subcarriers of the ratios between a Mean Error Rate (MER) threshold per subcarrier for the specific cable modem and the MER reported by the specific cable modem per subcarrier; and
assigning a new modulation profile to the specific modem based on said assessment.

12. The apparatus of claim 11, wherein the Mean Error Rate (MER) threshold per subcarrier for the specific cable modem is based, at least in part, upon a modulation order for each subcarrier and a predetermined mapping between modulation order and MER threshold.

13. The apparatus of claim 11, wherein examining the current modulation profile comprises:
calculating a score value for the current modulation profile using linear domain averaging of the ratios between a Mean Error Rate (MER) threshold for the specific cable modem and the MER reported by the specific cable modem; and
determining if the score value for the current modulation profile reflects that either the SNR conditions for the specific cable modem have improved or degraded by a predefined amount.

14. The apparatus of claim 13, wherein determining if the score value for the current modulation profile reflects that the SNR conditions for the specific cable modem have degraded comprises determining whether the score value for the current modulation profile has a negative value.

15. The apparatus of claim 13, wherein determining if the score value for the current modulation profile reflects that the SNR conditions for the specific cable modem have improved comprises determining whether the score value for the current modulation profile is larger than a determined predefined hysteresis value.

16. The apparatus of claim 11, wherein assessing which modulation profile, of a set of candidate modulation profiles available to that cable modem for communicating over the specific OFDM channel, should be assigned to the specific cable modem comprises:
using a first approach to identify an optimal modulation profile from the set of candidate modulation profiles when said set of candidate modulation profiles are uniform profiles having a constant modulation order across all subcarriers; and
using a second approach different than said first approach to identify an optimal modulation profile from the set of candidate modulation profiles are uniform profiles when said set of candidate modulation profiles are non-uniform profiles that use two or more modulation orders across all subcarriers.

17. The apparatus of claim 16, wherein said first approach comprises identifying a particular candidate modulation profile, from the set of candidate modulation profiles, having a lowest positive score value as the optimal modulation profile, wherein said score value is equal to $$-10*\log\left(\text{Average}\left(\frac{\text{LINEAR}[MERthreshold(p, i) + MERmargin(p)]}{\text{LINEAR}[MER(i)]}\right)\right),$$

wherein: p represents the profile, i represents the OFDM subcarrier index, LINEAR[x]=10^(x/10), MER(i) represents the reported MER by a cable modem, MERthreshold represents the appropriate value in a table of constants, and MERmargin(p) represents a user configurable value that is used to bias constant thresholds.

18. The apparatus of claim 16, wherein said second approach comprises, at least in part, identifying a particular candidate modulation profile, from the set of candidate modulation profiles, having highest capacity value as the optimal modulation profile, wherein said capacity value is equal to:

$\Sigma_i$ log 2(Modulation(p, i)), where p is the profile and i is the OFDM subcarrier index.

19. The apparatus of claim 18, wherein said second approach comprises:

upon determining that two or more profiles in the set of candidate modulation profiles are tied for the having highest capacity value, selecting, from said two or more profiles, the profile with highest score value as the optimal modulation profile, wherein said score value is equal to $$-10 * \log\left( \text{Average}\left( \frac{\text{LINEAR}[MERthreshold(p, i) + MERmargin(p)]}{\text{LINEAR}[MER(i)]} \right) \right),$$

wherein: p represents the profile, i represents the OFDM subcarrier index, LINEAR[x]=10^(x/10), MER(i) represents the reported MER by a cable modem, MERthreshold represents the appropriate value in a table of constants, and MERmargin(p) represents a user configurable value that is used to bias constant thresholds.

20. The apparatus of claim 11, wherein execution of the one or more sequences of instructions further cause:

identifying an optimal modulation profile from the set of candidate modulation profiles by examining a bounded portion of the excess MER per subcarrier for each of said set of candidate modulation profiles.

21. A method for assigning an appropriate modulation profile for an orthogonal frequency-division multiplexing (OFDM) channel, comprising:

examining a current modulation profile assigned to a specific cable modem for communicating over a specific OFDM channel to determine whether to consider reassigning the specific cable modem to a different modulation profile for use in communicating over the specific OFDM channel;

only upon determining said consideration should be given as a result of examining the current modulation profile, assessing which modulation profile, of a set of candidate modulation profiles available to that cable modem for communicating over the specific OFDM channel, should be assigned to the specific cable modem using linear domain averaging over the OFDM subcarriers of the ratios between a Mean Error Rate (MER) threshold per subcarrier for the specific cable modem and the MER reported by the specific cable modem per subcarrier; and assigning a new modulation profile to the specific modem based on said assessment.

* * * * *